Dec. 16, 1930.  J. F. MACKIN  1,785,521

DEVICE FOR TESTING CLAYS AND THE LIKE

Filed Nov. 15, 1928

Inventor
JOSEPH F. MACKIN his Attorneys

Patented Dec. 16, 1930

1,785,521

UNITED STATES PATENT OFFICE

JOSEPH F. MACKIN, OF COLUMBUS, OHIO

DEVICE FOR TESTING CLAYS AND THE LIKE

Application filed November 15, 1928. Serial No. 319,504.

The object of this invention is to provide an improved apparatus for testing or measuring the bonding strength of a plastic material-clay for instance.

The invention is embodied in the example herein shown and described, the features of novelty being pointed out in the claims.

In the accompanying drawing—

Figure 1:
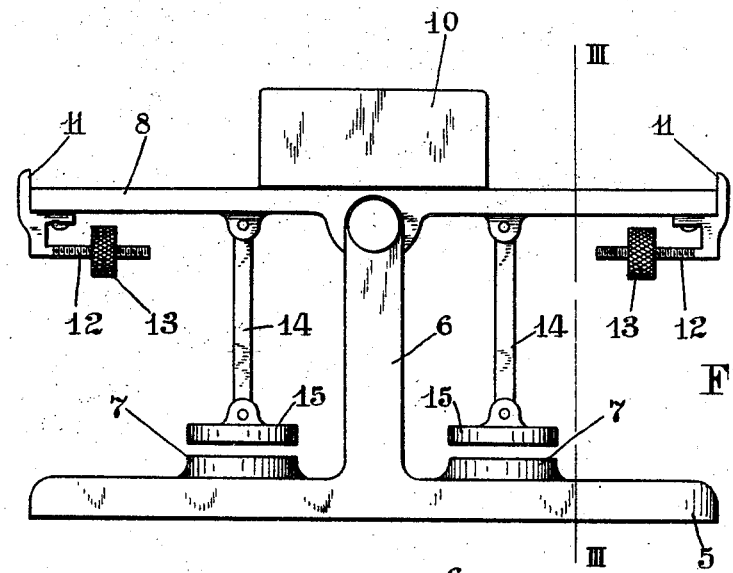
Figure 1 is a view in side elevation of the apparatus according to the invention.
Figure 2:
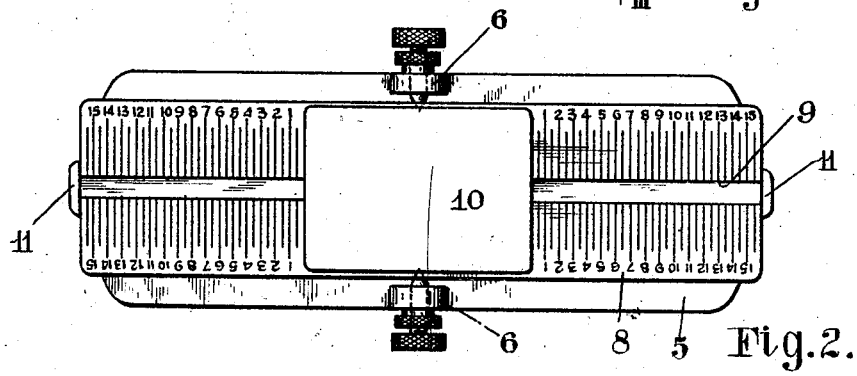
Fig. 2 is a top plan view.
Figure 3:
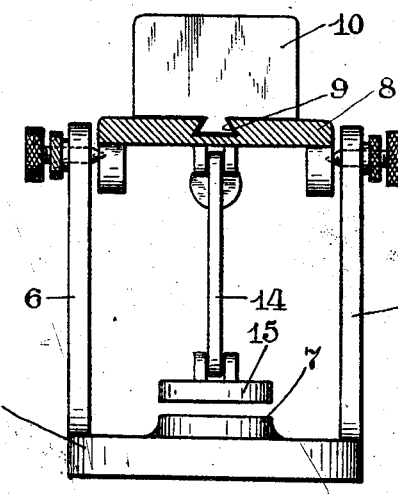
Fig. 3 is a cross section on the line III—III looking to the left.

In the views 5 designates the base from which rises a pair of pedestals 6, 6 and to the opposite sides of which pedestals and equally distant from their center plane are beds 7, 7.

Pivoted by means of adjustable conical bearings in the pedestal engaging corresponding sockets is a table 8 having a longitudinal dovetail groove 9 in which is slidable a weight 10, said weight having a tongue to engage it with said table. The upper side of the table is provided at each side of its middle beyond the ends of said weight in its middle position with a scale numbered in a series from 1 to 15 inclusive and reading from the middle of the table outward. The opposite extremities of the table and at the ends of the groove have secured to them a bracket that forms a stop 11 to prevent the accidental escape of the weight, and a screw 12 extending under the table provided with small weights 13 threaded on said screw so as to nicely balance the table when the weight thereon is in its middle position.

Pivoted to the under side of the table at points equally distant from the line of the table pivoting screws are pendent arms or links 14 carrying pressure heads 15 pivoted to the lower ends thereof. Each pressure head 15 normally lies a short distance above its companion bed so that when the bed 7 is tilted by movement of the weight in either direction from its balanced position the pressure head at the corresponding side descends into contact with the companion head or with material to be tested placed on said bed. The testing beds and their cooperating suspended plates are made of like form and area and from dense-grained metal carefully smoothed so as to make a close sealing of the specimens tested.

In practice a film of the material, say clay, moistened with a definite quantity of water to make it of pasty consistency is spread on the bed and pressure head, it being noted that because of the link 14 the pressure head can swing aside to permit this. The weight 10 is then moved to apply the pressure head to the material after which the weight is moved slowly and carefully in the opposite direction until the pressure head is removed from the bed below, the point on the scale coinciding with the end of the weight at which this occurs indicating in any desired units of force the tenacity or bonding strength of the material. One side of the instrument can be used for testing a single specimen of material, but the instrument shown is made with two pairs of the testing members so that comparative tests can be made of apparently differing specimens at substantially the same time.

The forms of the parts can be changed without departing from the gist of the invention as claimed.

What I claim is:

1. A device for testing the bonding strength of plastics and the like including a base, a table pivoted on said base, a bed adapted to receive said material to be tested, a compression member carried by the table to cooperate with said material receiving bed and a slidable weight on said table serving to separate the compression member from the material tested and indicate the bonding strength thereof.

2. A device for testing the bonding strength of plastics and the like including a base, a table pivoted on said base, a bed adapted to receive said material to be tested, a compression member carried by the table to cooperate with said material receiving bed, a slidable weight on said table serving to separate the compression member from the material tested and a scale on the table cooperating with the weight to indicate the bonding strength of the material.

3. A testing device of the kind described, including a base, a table pivoted on said base, two beds for receiving the material to be tested at opposite sides of the pivotal point of the table, two compression members carried by said table cooperating with said beds, and a weight slidable on said table from one side of the pivoting point to the other.

4. A testing device of the kind described including a base, a table pivoted on said base, two beds for receiving the material to be tested at opposite sides of the pivotal point of the table, two compression members carried by said table cooperating with said beds, a weight slidable on said table from one side of the pivoting point to the other and scales cooperating with said weight to indicate the results of the tests.

JOSEPH F. MACKIN.